US005926631A

United States Patent [19]
McGarvey

[11] Patent Number: 5,926,631
[45] Date of Patent: Jul. 20, 1999

[54] NETWORK COMPUTER EMULATOR SYSTEMS, METHODS AND COMPUTER PROGRAM PRODUCTS FOR PERSONAL COMPUTERS

[75] Inventor: John Ryan McGarvey, Apex, N.C.

[73] Assignee: International Business Machines Corporation, Armonk, N.Y.

[21] Appl. No.: 08/911,829

[22] Filed: Aug. 15, 1997

Related U.S. Application Data

[51] Int. Cl.⁶ ..................................................... G06F 9/455
[52] U.S. Cl. ........................ 395/500; 395/200.3; 395/712
[58] Field of Search ......................... 395/200.42, 200.53, 395/712

[56] References Cited

U.S. PATENT DOCUMENTS

| | | | |
|---|---|---|---|
| 4,939,507 | 7/1990 | Beard et al. | 340/706 |
| 5,146,568 | 9/1992 | Flaherty et al. | 395/325 |

OTHER PUBLICATIONS

Montague, "JN: OS for an Embedded Java Network Computer", IIIE Micro, vol. 17 No. 3, pp. 54–60, May 1997.
Hsieh, Gyllenhaal, Hwu, "Java Bytecode to Native Code Translation: the Caffeine Prototype and Preliminary Results, Proceedings of the 29th Annual IEEE/ACM International Symposium", pp. 90–97, 1996.
"The Runtime Object", http://silly.tau.ac.il/~tujava/java/system/runtime.htm, Dec. 1996.
"The Network Computer", http://ntrg.cs.tcd.ie/cs4/netcomp/netcomp.htm, Mar. 1997.
"Local Cache for Server Files", IBM Technical Disclosure Bulletin, vol. 36 No. 3, pp. 541–543, Mar. 1993.
"New Security Architectural Directions for Java (Extended Abstract)", Forty–Second IEEE Computer Society International Conference, pp. 97–102, Feb. 1997.

Primary Examiner—Kevin J. Teska
Assistant Examiner—Samuel Broda
Attorney, Agent, or Firm—Myers Bigel Sibley & Sajovec; Janine Ray-Yarlettes

[57] ABSTRACT

Network computer emulator systems, methods and computer program products for personal computers can provide many of the advantages of network computers to personal computers, without requiring the replacement of existing personal computers with network computers. A network computer emulator program obtains a Java runtime environment, Java desktop and Java applications from a server over a network. The network computer emulator program runs the Java runtime environment, Java desktop and Java applications on the personal computer. Data generated by the Java runtime environment, Java desktop and Java applications are stored at the server via the network, rather than storing the data generated by the Java runtime environment, Java desktop and Java applications in the persistent storage of the personal computer. Data for the Java runtime environment, Java desktop and Java applications are also obtained from the server over the network, rather than obtaining the data for the Java runtime environment, Java desktop and Java applications from the persistent storage. The persistent storage of the personal computer may be used as a Java code cache that stores the Java runtime environment, Java desktop and Java applications that are obtained from the server over the network.

15 Claims, 5 Drawing Sheets

NETWORK COMPUTER EMULATOR SYSTEMS, METHODS AND COMPUTER PROGRAM PRODUCTS FOR PERSONAL COMPUTERS

FIELD OF THE INVENTION

This invention relates to computer systems, methods and program products, and more particularly to personal computer systems, methods and program products.

BACKGROUND OF THE INVENTION

Personal computers are widely used in consumer and commercial environments. Personal computers include, but are not limited to, IBM® and IBM-compatible computers which operate in a Windows® or OS/2® environment. Personal computers can also include workstations operating in a Unix® or other environment. As is well known to those having skill in the art, a personal computer includes a central processing unit (also referred to as a "system unit") and a user interface that is responsive to user input and to the central processing unit. The user interface generally includes a display, a keyboard, and a pointing device such as a mouse. The personal computer also includes persistent storage such as a hard disk drive that stores programs and data. An operating system such as Windows 95®, OS/2® or Unix® is also stored in the persistent storage. A plurality of applications programs such as computer games or an office suite are also generally stored in the persistent storage.

Personal computers also may include a network interface application that communicates with a server over a network. The network interface application may be an Internet interface that communicates with the Internet using HTTP or other protocols. Examples of network interface applications include Netscape® Navigator® and Microsoft® Internet Explorer®.

As personal computers and their application programs become more sophisticated, it is becoming increasingly clear that their total cost of ownership, including hardware and software maintenance and upgrades, may be much larger than the initial cost of the hardware and software itself. In fact, up to $35,000 or more may be spent annually to maintain each personal computer in a corporate environment.

Network computers have been proposed in order to reduce this overall cost of ownership. Network computers generally do not require a user or administrator to install software on the computer. Rather, all software is loaded from a network server when the network computer is started or when needed during a session. The overall specifications for network computers are described in a document entitled *Profile Definition: Network Computer, X/Open, Document Number:* X975, published by The Open Group, Berkshire, UK (1997), the disclosure of which is hereby incorporated herein by reference. Network computers have presently been announced and/or shipped by IBM (Network Station model 8361), Sun Microsystems (JavaStation) and Neoware (model @ Workstation), as well as other vendors and models.

Programs for network computers are typically written in Java. As is well known to those having skill in the art, Java programs, in compiled form, are generally portable and will generally run on a wide range of computers and operating systems. Java programs support referencing Universal Resource Locator (URL) identifiers with content types of audio/basic, audio/x-wav, image/gif and image/jpeg. Java provides a machine dependent desktop for executing machine independent applications and applets.

Network computers are also known as "diskless computers" because they generally do not include persistent storage such as a floppy disk, hard disk or CD-ROM. Due to the lack of a disk, all programs and data, except for a small loading program, are obtained from the server.

Figure 1:
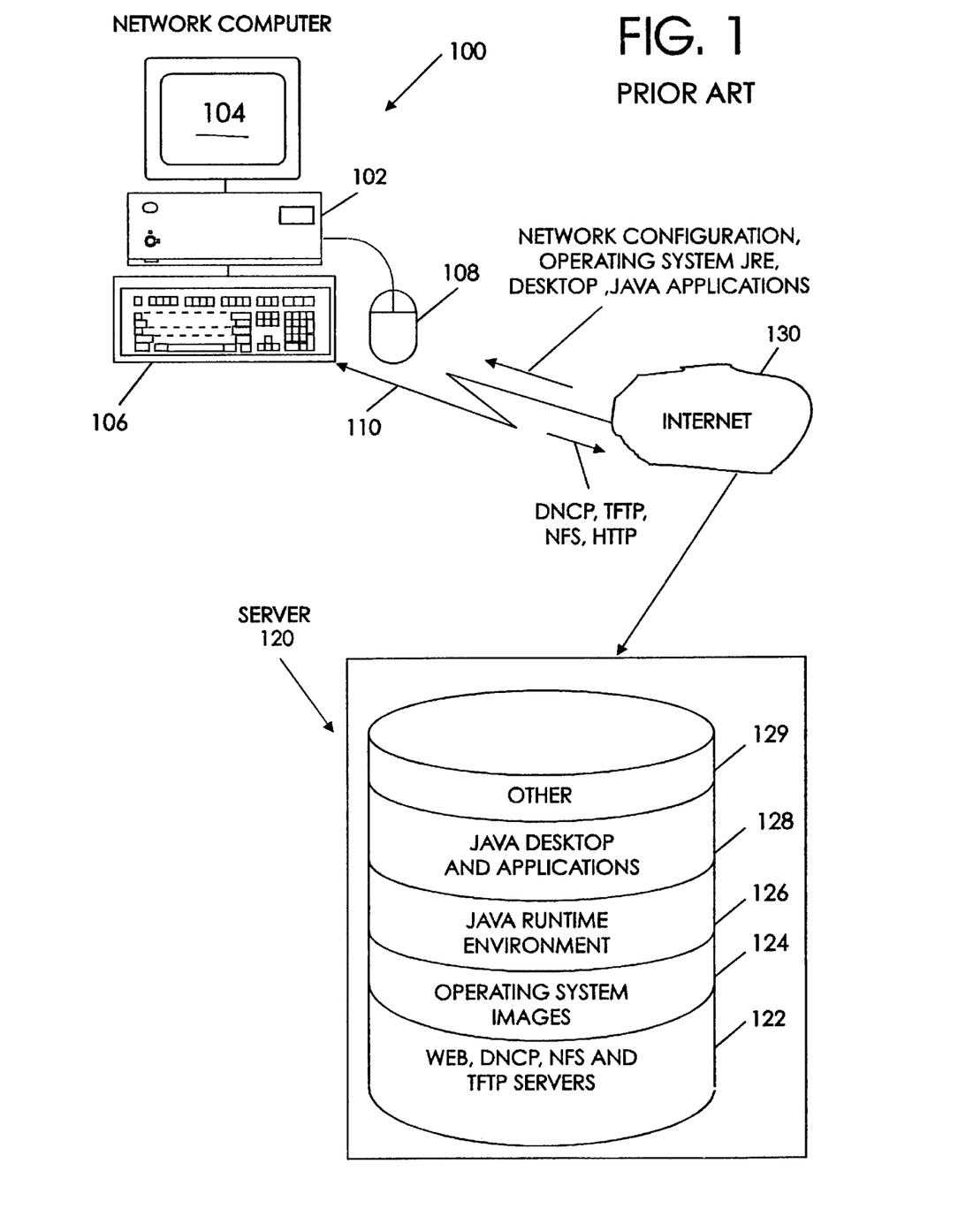
FIG. 1 is a simplified block diagram of a conventional network computer that communicates with a server over a network.

FIG. 1 is a simplified block diagram of a network computer that is connected to a server using an Internet connection. As shown in FIG. 1, network computer 100 includes a central processing unit 102 (also referred to as a "system unit") and a user interface including a display 104, a keyboard 106, and a pointing device (mouse) 108. As also shown in FIG. 1, the network computer does not generally include persistent storage for storing programs and data. A limited amount of volatile storage such as Random Access Memory (RAM) may be used to temporarily store applications and data while the network computer is running, but this volatile storage loses its information when the network computer is turned off. The network computer may also include permanent storage such as Read Only Memory, which may store small programs and minimal configuration information to load the network computer operating system and other components of the load image from a server. The permanent storage may also include a base key which is used for security purposes.

Network computer 100 also includes a network interface 110 that allows the computer to communicate with a server 120 using a network such as the Internet 130. As shown in FIG. 1, server 120 generally includes Web, DNCP, NFS and TFTP servers 122. The server 120 also stores operating system images 124 and a Java Runtime Environment (JRE) 126. A Java desktop and other applications 128 may also be included. Other non-Java related applications 129 may also be included.

Operations of the network computer of FIG. 1 to load a Java application from the server 120 via the network 130 will now be described. A small program enabling the initial program load for the network computer generally resides in permanent memory on the network computer. A base key to authenticate a load image may also reside in the permanent memory. The network computer may not include persistent memory such as a hard disk, diskette drive or CD-ROM. Network configuration data is loaded from the server 120 via the network 130 including the address of the server 122 to be used to load the network computer operating system. The network computer operating system 124 is loaded from the server 120 over the network 130. A base key ring may be loaded from the server over the network as part of this process. Each piece of code that is loaded may be authenticated with the base key or a base key ring.

Then, a Java runtime environment 126 is loaded from the server via the network. A Java desktop 128 and initial Java applications are also loaded from the server to the network computer via the network. The network computer user can cause the Java desktop to load and run additional Java applications from the network 130. These applications may load and store data on the network server 120 using NFS file access or HyperText Transmission Protocol (HTTP) requests. They may also load additional Java classes for network servers.

Unfortunately, network computers may also have limitations. In particular, because network computers typically obtain all of their programming from the network, they generally start slowly. Program loading may also burden the network 130 with network traffic. Moreover, network computer support of existing computer applications, such as Windows-based applications, may be limited, slow and clumsy.

Figure 2:
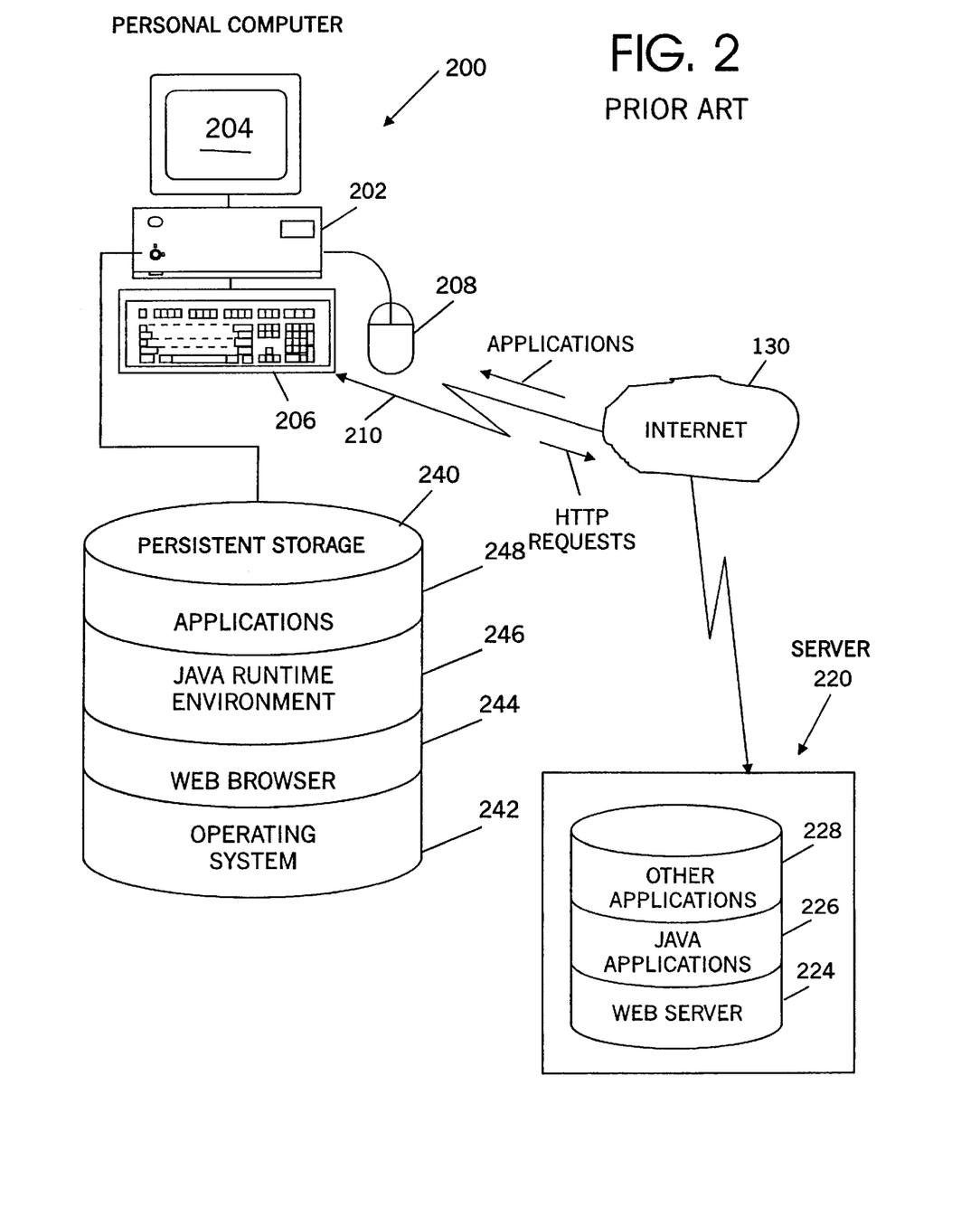
FIG. 2 is a simplified block diagram of a conventional personal computer that communicates with a server over a network.

It is also known to use a conventional personal computer to run Java programs which reside on network servers. FIG. 2 is a simplified block diagram of a conventional personal computer 200 that runs Java programs that are obtained from server 220 over the Internet 130.

As shown in FIG. 2, personal computer 200 includes a central processing unit 202 also referred to as a system unit, and a user interface including a display 204, a keyboard 206 and/or a pointing device such as a mouse 208. In addition, personal computer 200 includes persistent storage 240 such as a hard disk drive. Although the hard disk drive is shown as being external to the central processing unit 202 for ease of illustration, it will be understood that the hard disk drive 240 is generally included within the central processing unit 202. Permanent memory such as Read Only Memory (ROM) and volatile memory such as Random Access Memory (RAM) are also generally included in central processing unit 202.

As described above, a personal computer can run Java programs which reside on network servers. In order to do so, a Java runtime environment 246 is generally installed on the personal computer. Typically, the Java runtime environment 246 is installed along with a web browser 244 such as Netscape® Navigator® or Microsoft® Internet Explorer®. The web browser can run on an operating system 242 along with other applications 248. In operation, the user starts the browser 244 and uses it to load a Java application 226 from server 220 via network 230. Other applications 228 and other server functions 224 may also be obtained.

In particular, as shown in FIG. 2, the personal computer operating system 242, device drivers and configuration information reside on the personal computer hard disk 240. The user or administrator installs and configures a web browser 244, a Java runtime environment 246 and a key ring file for web browser security on the hard disk 240. The web browser runtime environment is generally a large file, and configuration can be complicated.

In use, the user starts the browser 244. The user causes the browser to load a Java application 226 from the server 220 via the network 130. The application may be signed, and the signature may be checked for validity. The Java application 226 may load subsequent Java program files and data from the network. It may also have access to Java program files, data and key ring files on the local hard disk 240 depending on how the browser is configured and what security privileges are assigned to the application. Thus, data is generally stored on the local hard disk 240.

Unfortunately, Java application access via a personal computer web browser 244 generally provides only a small measure of the reduced cost of ownership, the increased security and the ease of use which is generally associated with true network computing. For example, the browser code and the corresponding Java runtime environment are generally large in size, so that the user may install and maintain 40 megabytes or more of code. Moreover, browsers and associated Java runtime environments can vary widely in function and behavior so that a given Java application may or may not work with a given browser. Also, existing Java runtime environments may permit and in some cases may require that user data, preferences and security information reside on the local hard disk 240. This information then is locally administered and backed up as necessary, usually by the user, and may not be accessible to that user on a different machine or on a network computer.

Additionally, while browsers provide storage and access of state information for sharing among Java applications, a standard interface is generally not provided for this function. There is also generally no standard and portable mechanism for Java applications that are loaded by browsers to access key rings. The keys in these files are used to verify the integrity of Java applications by checking the digital signature of the code, and are also used to establish secure network connections with various servers using the Secure Socket Layer (SSL) protocol or other techniques. Key rings are currently provided and maintained by web browsers, but their contents are generally not accessible to Java applications in a consistent or portable way. Accordingly, it may be difficult for Java applications loaded by web browsers to be completely secure.

In summary, personal computers may include a high cost of ownership even when running Java programs which reside on network servers. On the other hand, network computers may also have limitations and will likely not replace the large installed base of personal computers in the near future.

SUMMARY OF THE INVENTION

The invention provides network computer emulator systems, methods and computer program products for personal computers that can provide many of the advantages of network computers to personal computers, without requiring the replacement of existing personal computers with network computers. In particular, personal computers according to the invention include a central processing unit (also referred to as a system unit), a user interface, a network interface, persistent storage and an operating system and applications programs that are stored in the persistent storage. Personal computers according to the invention also include a network computer emulator program. The network computer emulator program obtains a Java desktop and Java applications from the server over the network. The network computer emulator program runs the Java desktop and Java applications on the personal computer. Data generated by the Java desktop and Java applications are stored at the server via the network rather than storing the data generated by the Java desktop and Java applications in the persistent storage of the personal computer. Data for the Java desktop and Java applications are also obtained from the server over the network, rather than obtaining the data for the Java desktop and Java applications from the persistent storage.

Personal computers including network computer emulators according to the present invention can have application code and data reside on centrally administered servers rather than on user administered hard disks. There can be few, if any, dependencies on the specific computer hardware configuration. The same programs, data and user specific customization can be accessed from any personal computer which runs the emulator, or from any network computer. A secure environment, resistant to viruses and other forms of hacking and tampering, can be provided. The invention can also preserve some of the advantages of personal computers such as user access to the large base of personal computer native applications, a fast start-up process, reduced loading of the network and access to virtual memory as well as physical memory.

Network computer emulator programs, according to the invention, include a Java Runtime Environment (JRE) loader that is stored in the persistent storage of the personal computer and that loads a JRE matched to the operating system and hardware characteristics of the personal computer. The JRE loader also causes the JRE to load and to execute Java code, which may include extended security layer and/or a Java desktop. The JRE, extended security layer, and Java desktop are loaded over the network from a server, and the specific network location may be specified by the URL with which the JRE loader is configured. The JRE loader may also be configured with a base key for security, which is used to establish the authenticity of the JRE, extended security layer, and desktop as loaded from the server.

Network computer emulator programs according to the invention generally do not store data on the persistent storage of the personal computer. However, the persistent storage may be used as a Java code cache that stores the JRE, the Java desktop and/or Java applications that are obtained from the server over the network. When the network computer emulator is used again, if the stored JRE, Java desktop and/or Java applications are validated by the server over the network, the stored JRE, Java desktop and/or stored Java application are run rather than obtaining a new JRE, a new Java desktop and/or new Java applications from the server over the network. Accordingly, the turn-on or boot time of the network computer can be reduced by using the personal computer's persistent storage as a Java code cache.

The network computer emulator may also include an extended security layer that is obtained from the server over the network and that is used to provide an authenticated key ring for verification of code signatures and for use in establishing Secure Sockets Layer (SSL) or other secure network connections. Existing Java Virtual Machines for personal computers may already verify code signatures if a keyring is provided, but such keyrings are generally kept on the hard disk or in other persistent storage of the personal computer. An extended security layer according to the invention allows an authenticated keyring to be obtained without depending on the hard disk or other personal computer persistent storage.

According to the invention, personal computers including persistent storage that stores programs and data to emulate a network computer that does not include persistent storage that stores programs and data, obtains a JRE, a Java desktop and Java applications from a server over a network. The JRE, Java desktop and Java applications are run on the personal computer. Data generated by the JRE, Java desktop and Java applications are stored at the server via the network rather than storing the data generated by the JRE, Java desktop and Java applications in the persistent storage.

Preferably, the JRE is obtained by a JRE loader that is stored in the persistent storage. Moreover, the JRE, Java desktop and Java applications are cached in the persistent storage. When caching is used, to run the Java applications, the personal computer validates the cached Java desktop and the cached JRE, cached Java applications by the server over the network, and runs the cached JRE, cached Java desktop and cached Java applications rather than obtaining a new JRE, new Java desktop and new Java applications, if the cached JRE, Java desktop and Java applications are validated by the server over the network.

The network computer emulator program can include a JRE loader, an extended security layer, and modifications to the behavior of the JRE, which modifications may be implemented as modifications to the code of the JRE itself, or may be implemented as part of the emulator environment surrounding the JRE. These modifications (a) cause the data to be written to the network server instead of to the personal computer hard disk, (b) permit Java code such as the Java desktop and applications to be cached on the disk, and (c) constrain and modify the Java classes that may be loaded so that only those classes obtained from the server, and not any resident on the hard disk, may be used by Java applications running within the emulator environment.

Another aspect of the invention provides for initiating operations of a personal computer including persistent storage that stores programs and data, to emulate a network computer that does not include persistent storage that stores programs and data. Operations are initiated in response to user activation of network computer emulation in the personal computer by obtaining a JRE from a Java code cache in the personal computer. The JRE is validated with a server over a network. A valid JRE is obtained from the server over the network if the JRE from the Java code cache is not valid, and the valid JRE which was obtained from the server over the network is stored in the Java code cache if the JRE obtained from the Java code cache was not valid.

A Java application is then obtained from the Java code cache in the personal computer. The Java application is validated with the server over the network. A valid Java application is obtained from the server over the network if the Java application from the Java code cache is not valid. The valid Java application which was obtained from the server over the network is stored in the Java code cache if the Java application obtained from the Java code cache is not valid.

The Java application is then run on the personal computer using the Java desktop. Data generated by the Java desktop and Java applications are stored at the server via the network and are not stored in the persistent storage. Data for the Java desktop and Java applications are obtained from the server over the network rather than from the persistent storage. Accordingly, many of the benefits of network computing may be obtained in personal computers.

As will be appreciated by those of skill in the art, the present invention may be embodied as methods, systems or computer program products. Thus, methods, systems and computer program products for operating a personal computer to emulate a network computer are provided.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 3:
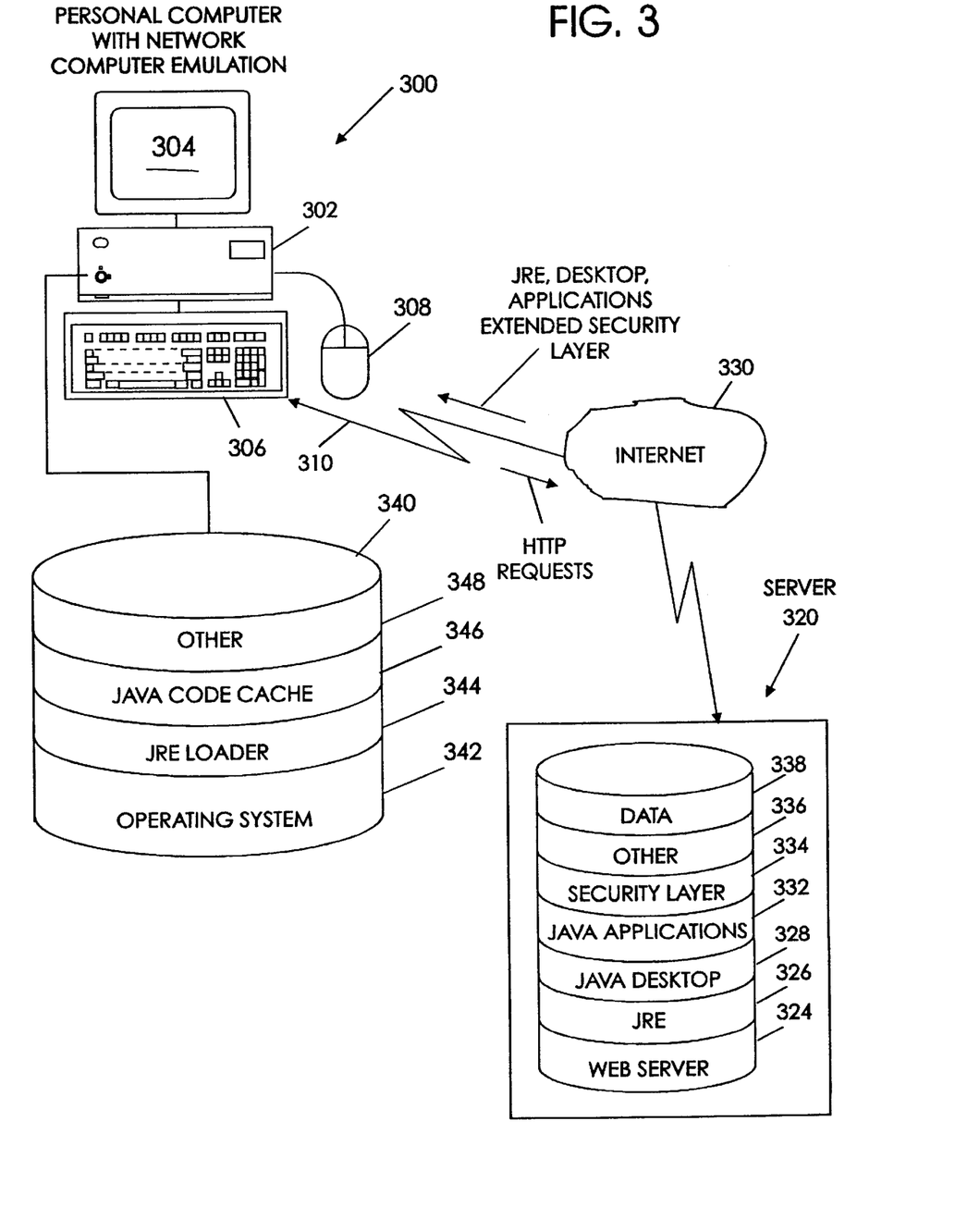
FIG. 3 is a simplified block diagram of personal computers including network computer emulation according to the present invention that communicate with a server over a network.

Referring now to FIG. 3, a simplified block diagram of a personal computer including network computer emulation, communicating with a server over a network according to the present invention will now be described. As shown in FIG. 3, a personal computer 300 includes a central processing unit 302 (also referred to as a "system unit") and a user interface including a display 304, a keyboard 306, and/or a pointing device such as a mouse 308. The user interface is responsive to user input and to the central processing unit 302. The personal computer also includes a persistent storage 340 such as a hard disk that stores programs and data. An operating system is stored in area 342 and other programs and data are stored in area 348.

Still referring to FIG. 3, a network computer emulator program is also included. The network computer emulator program includes a Java Runtime Environment (JRE) loader 344 that obtains JRE 326 from the server over the network, runs the JRE and causes it to obtain a Java desktop 328 and Java applications 332 from the server 320 over the network 330. Data generated by the JRE, Java desktop and Java applications are stored at the server in area 338 via the network 330. The data generated by the JRE, Java desktop and Java applications are not stored in the persistent storage 340 of the personal computer 300. Similarly, data used by the JRE, Java desktop and Java applications is obtained from the server over the network, rather than from the persistent storage of the personal computer. It will be understood by those having skill in the art that although persistent storage 340 of the personal computer is shown as being outside central processing unit 302, the persistent storage such as a hard drive is generally included in the central processing unit 302.

Figures 4, 5B:
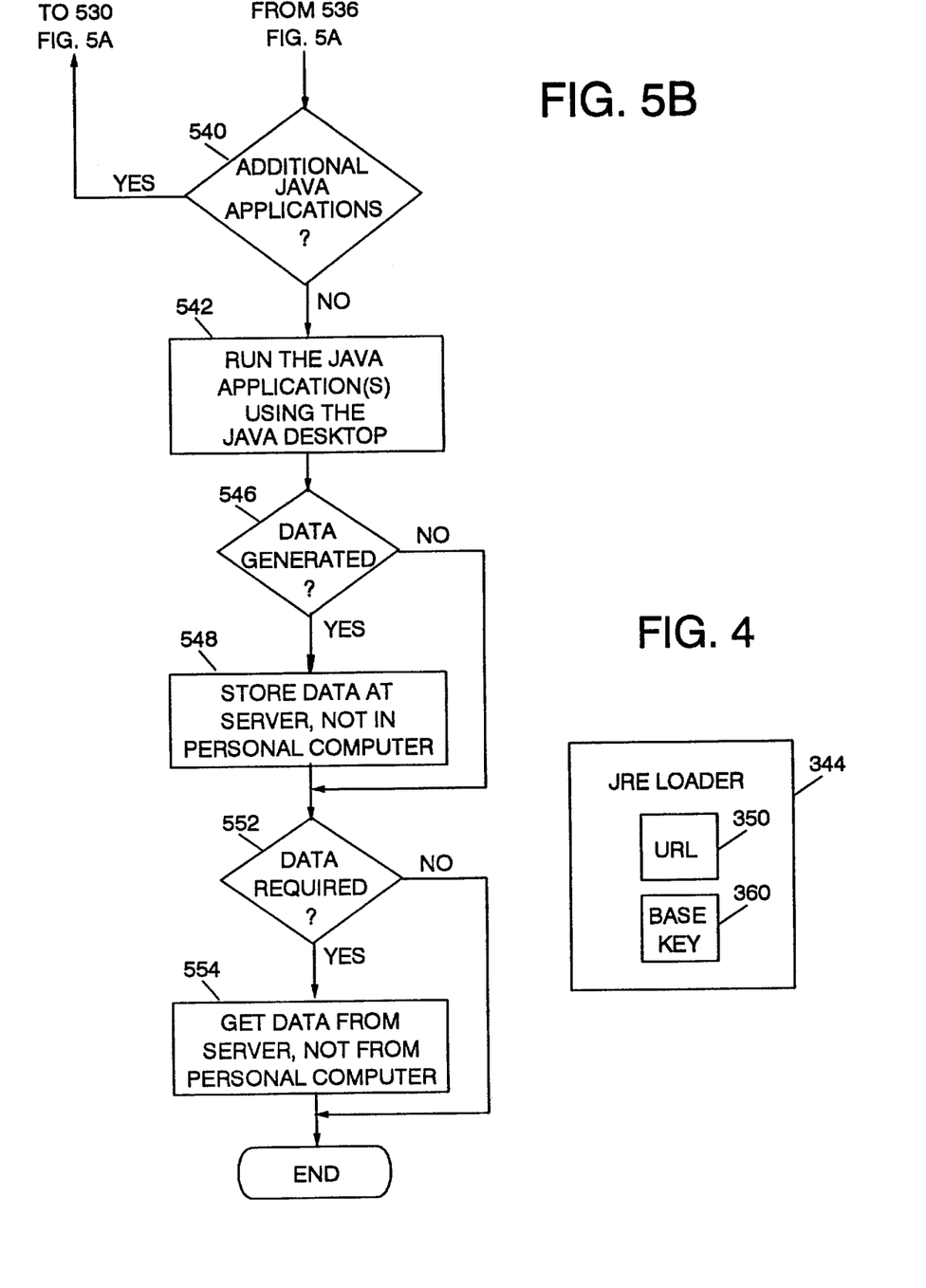
FIG. 4 is a block diagram of a Java runtime environment loader according to the present invention.
FIGS. 5A and 5B is a flowchart of operations of network computer emulator systems methods and computer program products for personal computers according to the present invention.

Network computer emulation according to the present invention will now be described in further detail. The JRE loader 344 is generally a small program that is used to download the JRE 326 from the network server 320. This small program can be the only software that is installed on the personal computer by a user or administrator. As shown in FIG. 4, the JRE loader preferably includes a Universal Resource Locator (URL) identifier 350 and a base key 360 which are used as described below. After loading the JRE file 326, the JRE loader 344 checks a code signature to make sure that the JRE is authentic and has not been modified to compromise security.

Returning to FIG. 3, a Java code cache 346 may be included in the persistent storage 340 of the personal computer 300. In order to speed the loading process and to minimize network traffic, the JRE loader 344 caches the JRE in the Java code cache 346 of the personal computer hard disk. During subsequent invocations, the JRE loader 344 need not load the JRE 326 from the network server 320 unless the JRE on the server has been updated or unless the signature of the local copy is invalid, indicating corruption of the cache file. Thus, the network computer emulator runs the stored Java desktop and stored Java applications from the Java code cache 346, rather than obtaining a new Java desktop and new Java applications, if the stored Java desktop and stored Java applications are validated by the server over the network. In order to validate, the code is checked for currency and integrity from modifications.

After loading the JRE, the JRE loader 344 causes the JRE to load a file of Java classes including enhancements to Java security. This is referred to as an extended security layer 334. This extended security layer 334 can include a base key ring for secure network connections such as SSL connections, code signature verification and other uses. It also can include functionality to store state variables associated with the user and the user's network computer emulator session, to authenticate the user and to access smartcard data if necessary. The file of security classes can contain a code signature, and its authenticity and integrity are verified.

Finally, the JRE loader 344 causes the JRE to load the initial Java desktop 328 that supports web browsing and the loading of various Java applications 332. Desktop 328 also preferably contains a code signature, and its authenticity and integrity are verified.

It will be understood that the JRE 326 should preferably change the default JRE handling of files. In particular, Java applications and applets should not access the local personal computer hard disk (persistent storage 340) when run from the JRE 326. Rather, all Java file access is redirected, within the JRE, to a data area 338 on network file system server 320. Additional modifications may be made to the JRE for caching of Java classes and archive files on the local hard disk 340. Before using cache entries, the validity and currency preferably are checked to validate whether an update from the server is necessary or desirable before code is loaded. Since the code is often validated, the JRE will often load the extended security layer, the Java desktop and Java applications from the local cache 346, thus decreasing load time.

The JRE may also provide application program interfaces that connect Java applications and the Java classes of the extended security layer. In general, when Java applications are run on personal computers using Netscape® Navigator® or other web browsers, they have access to the base Java classes included in the Java runtime environment, to certain other classes residing in archive files on the personal computer hard disk and made available by the browser, and to any other Java classes the application itself may load from the network. Preferably, according to the invention, Java applications within the network computer emulator environment access only the Java runtime environment base classes, the classes of the extended security layer, certain classes of the Java desktop and the classes the application itself loads from the network. However, the applications are prevented from loading Java classes from the personal computer hard disk. Thus, the network computer emulation environment can be made secure, predictable and centrally administrable.

Figure 5A:
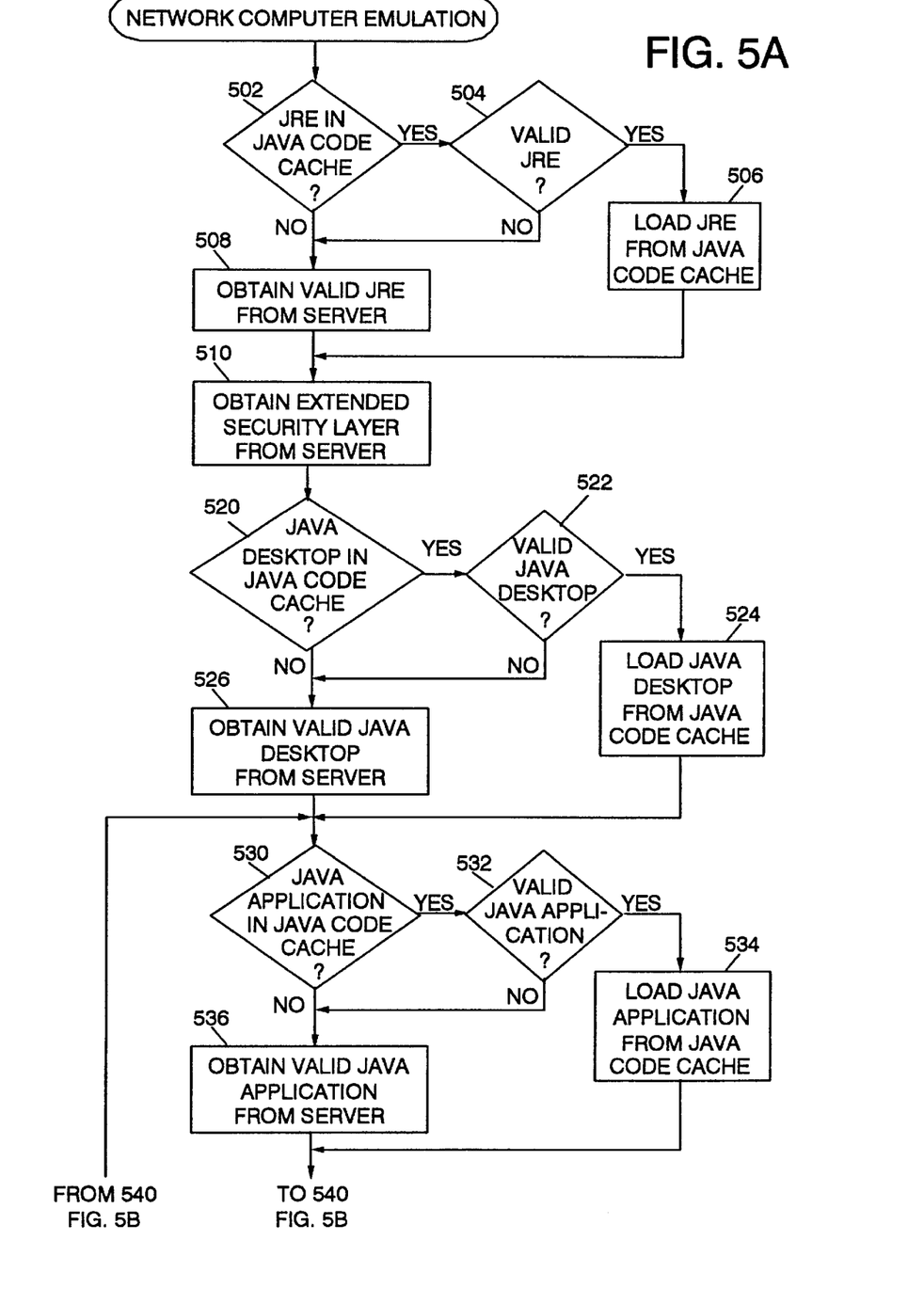

Referring now to FIGS. 5A and 5B, a flowchart illustrating operations of network computer emulator systems, methods and program products for personal computers according to the invention will now be described. It will be understood that each block of the flowchart illustrations, and combinations of blocks in the flowchart illustrations, can be implemented by general and/or special purpose hardware-based systems which perform the specified functions or steps, or by combinations of general and/or special purpose hardware and computer instructions.

These program instructions may be provided to a processor to produce a machine, such that the instructions which execute on the processor create means for implementing the functions specified in the block or blocks. The computer program instructions may be executed by a processor to cause a series of operational steps to be performed by the processor to produce a computer implemented process such that the instructions which execute on the processor provide steps for implementing the functions specified in the block or blocks. Accordingly, blocks of the drawings support combinations of means for performing the specified functions, combinations of steps for performing the specified functions and program instruction means for performing the specified functions.

As already described, the personal computer operating system 342, device drivers and configuration information reside on the personal computer hard disk 340. The network computer emulator program, including but not limited to the JRE loader 344, is installed on the personal computer hard disk 340. The JRE loader 344 is preferably stored on hard disk 340, and the other components of the network computer emulator program are installed on the server. The JRE loader program can be small and can require minimal configuration. It includes the Uniform Resource Locator (URL) 350 for use in loading the JRE. It also includes a base key 360 for use in authenticating the JRE code.

Referring to FIGS. 5A and 5B at Block 502, the JRE loader checks for whether the JRE is located in the Java code cache 346. If yes at Block 504, a check is made whether its signature matches the signature of the JRE on the server. If not, a valid JRE is obtained from the server at Block 508. If yes, the JRE is loaded from the Java code cache at block 506. The loader then causes the extended security layer to be obtained from the server at Block 510.

At Block 520, the JRE loader 344 checks whether the Java desktop is in the Java code cache. If yes, at Block 522 a validity check is performed as described above. If the Java desktop is valid, it is loaded from the Java code cache (Block 524). If it is not valid, then at Block 526 a valid Java desktop is obtained from the server.

The user then causes the Java desktop to load additional Java applications. Again, as these load requests pass through the JRE, it checks to see if a cached copy of the requested application is present (Block 530), validates it for currency with the server version (Block 532) and if authentic, it uses that copy at Block 534. Otherwise, the application is loaded from the server at Block 536. Such applications may load additional data and Java code at Block 540 and the applications are run using the Java desktop at Block 542. If these applications use file access to store data (Block 546) or to obtain data (Block 552), the data is stored and obtained (Blocks 548 and 554, respectively) at the server, not in the personal computer. These Java applications may also communicate with the extended security layer to establish secure network connections, to access data resident on a smartcard, to authenticate the user or to access session state information.

Accordingly, by emulating a network computer on a personal computer, benefits of network computing can be provided on a personal computer. A smooth transition path from personal computer-based client-server computing to the network computer paradigm can be provided without requiring additional network computer hardware. Existing personal computer hardware, device drivers and attached devices can be used. Moreover, users who sometimes need the functions of a dedicated personal computer can reduce their ownership costs and access all networking computer accessible data without requiring redundant hardware.

Thus, Windows programs can concurrently run with a network computer emulator, using local code and data, without requiring Winframe or other remote application servers. In particular, the user may continue to use existing Windows desktop applications for personal computer intensive functions. However, as more and more functionality is delivered via the network computer emulator environment, the user may have less need to maintain a Windows desktop, and change a Windows desktop and the system administrator may have smaller requirements to maintain applications residing on the user machine. Most, if not all, access to enterprise data can occur through the network computer emulator.

Network computer emulation, according to the present invention, is significantly different from Windows web browser access to Java. In particular, when a user accesses Java applets via a browser, the user installs and maintains the browser and the local Java virtual machine. Many browsers are increasing in functionality and complexity so that maintenance and customization may become more difficult. Moreover, browsers store user preferences and data on the local hard disk, so that customization and data generally is local to the machine. Thus, a user may not obtain the same preferences, bookmarks and saved data on any other machine. Moreover, the user has a responsibility for maintaining the data on the local personal computer, for backing it up and for keeping it secure.

The Java support provided by different browsers can vary widely. As a result, many of the Java applets accessible from a network computer may not run under a given browser. Finally, when using a Windows browser, the user generally does not go through a standard logon procedure to authenticate the user and to access the network resources. Thus, browser access to Java applets may not provide as much network computer value as true network computer computing.

Network computer emulators for personal computers, according to the present invention, generally do not store data, user preferences or other information on the local hard disk. The environment may be dependent on local operating system services only as needed to run a Java virtual machine. A Java runtime environment is loaded from the server so that local Java is in a known state. The Java runtime environment is different from current Windows Java, for example, in the handling of file access as described above. The small Java runtime environment loader resides on the personal computer and invokes the initial Java desktop application. This program can be downloaded from the server or installed from a diskette. This is the only additional piece of programming which may need to be added to the personal computer according to the present invention.

Once the Java desktop application is running, the environment presented to the user may be indistinguishable from that of a network computer. However, the user can still access personal computer functions, for example, by running Windows programs concurrently with the emulator. Since the personal computer may support smartcards, there can be a mechanism to access security data such as the encrypted data that would reside on the smartcard, on the diskette or on the hard disk. The hard disk may be used to cache the Java Runtime Environment code and Java applications or applets. The integrity and currency of the cached code is verified before it is loaded and cache contents are updated from the server if necessary. It will also be understood that the present invention may also be used with personal computers that use desktops, applications and runtime environments other than Java.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A personal computer comprising:
a central processing unit;
a user interface that is responsive to user inputs and to the central processing unit;
a network interface that communicates with a server over a network;
persistent storage that stores programs and data;
an operating system that is stored in the persistent storage;
a plurality of applications programs that are stored in the persistent storage; and
a network computer emulator program that obtains a Java desktop and Java applications from the server over the network, that runs the Java desktop and Java applications on the personal computer, and that stores data generated by the Java desktop and Java applications at the server via the network rather than storing the data generated by the Java desktop and Java applications in the persistent storage wherein the network computer emulator program comprises:
 a loader that is stored in the persistent storage, and that loads a Java desktop and Java applications from the server over the network; and
 a Java code cache in the persistent storage that stores the Java desktop and Java applications obtained from the server over the network, and that runs the stored Java desktop and stored Java applications rather than obtaining a new Java desktop and new Java applications, if the stored Java desktop and Java applications are validated by the server over the network.

2. A personal computer according to claim 1, wherein the network computer emulator further comprises:
an extended security layer that is obtained from the server over the network, and that is used to verify code signatures.

3. A personal computer according to claim 1 wherein the network computer emulator program also obtains data for the Java desktop and Java applications from the server over the network, rather than obtaining the data for the Java desktop and Java applications from the persistent storage.

4. A method of operating a personal computer including persistent storage that stores programs and data, to emulate a network computer that does not include persistent storage that stores programs and data, the method comprising the following steps which are performed by the personal computer:
obtaining a Java desktop and Java applications from a server over a network;
running the Java desktop and Java applications on the personal computer;
storing data generated by the Java desktop and Java applications at the server via the network rather than storing the data generated by the Java desktop and Java applications in the persistent storage and
caching the Java desktop and Java applications obtained from the server over the network in the persistent storage;
wherein the running step comprises the steps of:
 validating the cached Java desktop and the cached Java applications by the server over the network; and
 running the cached Java desktop and cached Java applications rather than obtaining a new Java desktop and new Java applications, if the cached Java desktop and Java applications are validated by the server over the network.

5. A method according to claim 4 wherein the obtaining step is performed by a loader that is stored in the persistent storage.

6. A method according to claim 4 wherein the obtaining step further comprises the step of obtaining an extended security layer from the server over the network.

7. A method according to claim 4 further comprising the step of obtaining data for the Java desktop and Java applications from the server over the network, rather than obtaining the data for the Java desktop and Java applications from the persistent storage.

8. A computer program product for operating a personal computer including persistent storage that stores programs and data, to emulate a network computer that does not include persistent storage that stores programs and data, the computer program product comprising a computer-readable storage medium having computer-readable program code means embodied in the medium, the computer-readable program code means comprising:
computer-readable program code means for obtaining a Java desktop and Java applications from a server over a network;
computer-readable program code means for running the Java desktop and Java applications on the personal computer;
computer-readable program code means for storing data generated by the Java desktop and Java applications at the server via the network rather than storing the data generated by the Java desktop and Java applications in the persistent storage;
computer-readable program code means for caching the Java desktop and Java applications obtained from the server over the network in the persistent storage; and
computer-readable program code means for validating the cached Java desktop and the cached Java applications by the server over the network;
wherein the computer-readable program code means for running the Java desktop and Java applications on the personal computer comprises computer-readable program code means for running the cached Java desktop and cached Java applications rather than obtaining a new Java desktop and new Java applications, if the cached Java desktop and Java applications are validated by the server over the network.

9. A computer program product according to claim 8 wherein the obtaining means comprises a loader that is stored in the persistent storage.

10. A computer program product according to claim 8 wherein the obtaining means further comprises computer-readable program code means for obtaining an extended security layer from the server over the network.

11. A computer program product according to claim 8 further comprising:
computer-readable program code means for obtaining data for the Java desktop and Java applications from the server over the network, rather than obtaining the data for the Java desktop and Java applications from the persistent storage.

12. A computer program product for operating a personal computer including persistent storage that stores programs and data, to emulate a network computer that does not include persistent storage that stores programs and data, the computer program product comprising a computer-readable storage medium having computer-readable program code means embodied in the medium, the computer-readable program code means comprising:

computer-readable program code means for obtaining a desktop and applications that run on the desktop from a server over a network;

computer-readable program code means for running the desktop and applications on the personal computer;

computer-readable program code means for storing data generated by the desktop and applications at the server via the network rather than storing the data generated by the desktop and applications in the persistent storage;

computer-readable program code means for caching the desktop and applications obtained from the server over the network in the persistent storage; and computer-readable program code means for validating the cached desktop and the cached applications by the server over the network;

wherein the computer-readable program code means for running the desktop and applications on the personal computer comprises computer-readable program code means for running the cached desktop and cached applications rather than obtaining a new desktop and new applications, if the cached desktop and applications are validated by the server over the network.

13. A computer program product according to claim 12 wherein the obtaining means comprises a loader that is stored in the persistent storage.

14. A computer program product according to claim 12 wherein the obtaining means further comprises computer-readable program code means for obtaining an extended security layer from the server over the network.

15. A computer program product according to claim 12 further comprising:

computer-readable program code means for obtaining data for the desktop and applications from the server over the network, rather than obtaining the data for the desktop and applications from the persistent storage.

* * * * *